US009660795B2

(12) United States Patent
Kiyomizu

(10) Patent No.: US 9,660,795 B2
(45) Date of Patent: May 23, 2017

(54) START-STOP SYNCHRONOUS TYPE SERIAL DATA ACQUISITION DEVICE AND START-STOP SYNCHRONOUS TYPE SERIAL DATA ACQUISITION METHOD

(71) Applicant: LAPIS SEMICONDUCTOR CO., LTD., Kanagawa (JP)

(72) Inventor: Keisuke Kiyomizu, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 14/821,899

(22) Filed: Aug. 10, 2015

(65) Prior Publication Data

US 2016/0050063 A1 Feb. 18, 2016

(30) Foreign Application Priority Data

Aug. 13, 2014 (JP) ................................ 2014-164837

(51) Int. Cl.
*H04L 5/24* (2006.01)
*H04L 7/04* (2006.01)

(52) U.S. Cl.
CPC ................ *H04L 5/24* (2013.01); *H04L 7/044* (2013.01)

(58) Field of Classification Search
CPC ..... H04L 5/24; H04L 7/00; H04L 7/02; H04L 7/0278; H04L 7/044; H04L 7/06; H04L 25/38; H04L 25/40
USPC ........ 375/360, 362, 264, 369; 370/506, 509; 713/502
See application file for complete search history.

(56) References Cited

U.S. PATENT DOCUMENTS 5,748,923 A * 5/1998 Eitrich .............. G05B 19/0421 710/305
2011/0095815 A1* 4/2011 Higuchi .............. H03K 5/1252 327/551
2011/0281593 A1* 11/2011 Chard .................. H04J 3/0697 455/461
2013/0082794 A1* 4/2013 Kris ........................ H03K 7/08 332/108
2014/0333361 A1* 11/2014 Chau ...................... H03K 3/017 327/175

FOREIGN PATENT DOCUMENTS

JP 2000216834 A 8/2000

* cited by examiner

*Primary Examiner* — Young T Tse
(74) *Attorney, Agent, or Firm* — Volentine & Whitt, PLLC

(57) ABSTRACT

A start-stop synchronous type serial data acquisition device includes a counter to which a clock signal that defines an acquisition timing of serial data including a start bit is input, and that counts a number of cycles of a clock signal; and a changing section that, according to a transition of the clock signal when the start bit has been input, changes a maximum count value that is counted by the counter, the maximum count value corresponding to the start bit.

5 Claims, 9 Drawing Sheets

10
16
12
LOW SPEED OSCILLATION CIRCUIT
CLOCK SIGNAL
START BIT DETECTION SIGNAL
20
START BIT DETECTION CIRCUIT
COUNT START SIGNAL
DETECTION TIMING DISCRIMINATION CIRCUIT
22
SUBTRACTION INSTRUCTION SIGNAL
SUBTRACTION CIRCUIT
24
COUNT CLEAR SIGNAL
COUNTER
14
COUNT VALUE
18
26
SHIFT REGISTER
RECEIVED DATA
28
RECEPTION REGISTER
RECEIVED DATA

SUBTRACTION INSTRUCTION SIGNAL
SUBTRACTION CIRCUIT
22
42
FF
38
40
36
DISCRIMINATION SIGNAL
COUNT START SIGNAL
COUNTER
20
32
FF
34
FF
START BIT SIGNAL
START BIT SIGNAL
30
RECEIVED DATA
CLOCK SIGNAL
COUNT CLEAR SIGNAL

START-STOP SYNCHRONOUS TYPE SERIAL DATA ACQUISITION DEVICE AND START-STOP SYNCHRONOUS TYPE SERIAL DATA ACQUISITION METHOD

CROSS-REFERENCE TO RELATED APPLICATION

This application claims priority under 35 USC 119 from Japanese Patent Application No. 2014-164837 filed Aug. 13, 2014, the disclosure of which is incorporated by reference herein.

BACKGROUND

Technical Field

The present disclosure relates to a start-stop synchronous type serial data acquisition device and a start-stop synchronous type serial data acquisition method.

Related Art

In start-stop synchronous type serial communication, control signal lines for always synchronizing serial data, such as signal lines that transmit clock signal, do not exist. Accordingly, in start-stop synchronous type serial communication, communications are performed by generating a baud rate based on a clock signal for communication that is used within respective communication circuits. However, difference arises in the baud rates generated in respective signal circuits, and the differences in the baud rates become differences in acquisition timings of serial data.

In a conventional start-stop synchronous type serial communication, as illustrated in FIG. 7 as an example, received data is sampled at the rising edge of the baud rate (at a fixed timing) that is generated in a reception circuit. Further, the differences in baud rate between each of the communication circuits are corrected by adjusting high level segments of the baud rate generated in the reception circuit, in a case in which stop bit has been detected.

Further, as technology for suppressing the baud rate differences, Japanese Patent Application Laid-open (JP-A) No. 2000-216834 discloses a synchronizing circuit that controls output of synchronizing clock signal that synchronize the received data. In this synchronization circuit, starting positions of the received data are detected at the rising edges and falling edges of a detection clock signal, and the synchronization clock signal is output based on the rising edge or falling edge that is closest to the detected starting position.

In a case in which a low speed clock signal having an order of several tens of kHz is used for sampling, detection of start bit may delay for one cycle in maximum, depending on the timing of the input of the start bit, as illustrated in FIG. 9 as an example (a 38.4 kHz clock signal is illustrated in FIG. 9 as the example).

On the other hand, in the technology described in JP-A No. 2000-216834, since a circuit that operates based on the rising edges and a circuit that operates based on the falling edges are required, circuit scale of a counter that generates the baud rate may be doubled.

Further, as technology for suppressing a delay in the acquisition timing of serial data, there is a sampling method that dynamically switches all of operating clock signal edges based on the edge that has detected the start bit. However, this method is not recommended for use in synchronizing designs employing register transfer level (RTL) (for example, a design based on that the data is acquired at the rise of the clock signal), which is currently in mainstream usage, or in static timing analysis (STA) which is based on a synchronizing design. Further, in the above method, high difficulty in design and high verification may be necessary.

SUMMARY

The present disclosure provides a start-stop synchronous type serial data acquisition device and a start-stop synchronous type serial data acquisition method that may suppress delay in acquisition timing of the serial data with a simple configuration.

A first aspect is a start-stop synchronous type serial data acquisition device including: a counter to which a clock signal that defines an acquisition timing of serial data including a start bit is input, and that counts a number of cycles of a clock signal; and a changing section that, according to a transition of the clock signal when the start bit has been input, changes a maximum count value that is counted by the counter, the maximum count value corresponding to the start bit.

A second aspect is a start-stop synchronous type serial data acquisition method including: counting a number of cycles of an input clock signal that defines an acquisition timing for serial data including a start bit; and according to a transition of the clock signal when the start bit has been input, changing a maximum count value that corresponds to the start bit.

According to the above aspects, the present disclosure may suppress delay in acquisition timing of serial data with a simple configuration.

BRIEF DESCRIPTION OF THE DRAWINGS

Exemplary embodiments will be described in detail based on the following figures, wherein.

DETAILED DESCRIPTION

Hereinbelow, detailed explanation regarding an exemplary embodiment that implements technology of the present disclosure will be described, with reference to the drawings.

Figure 1:
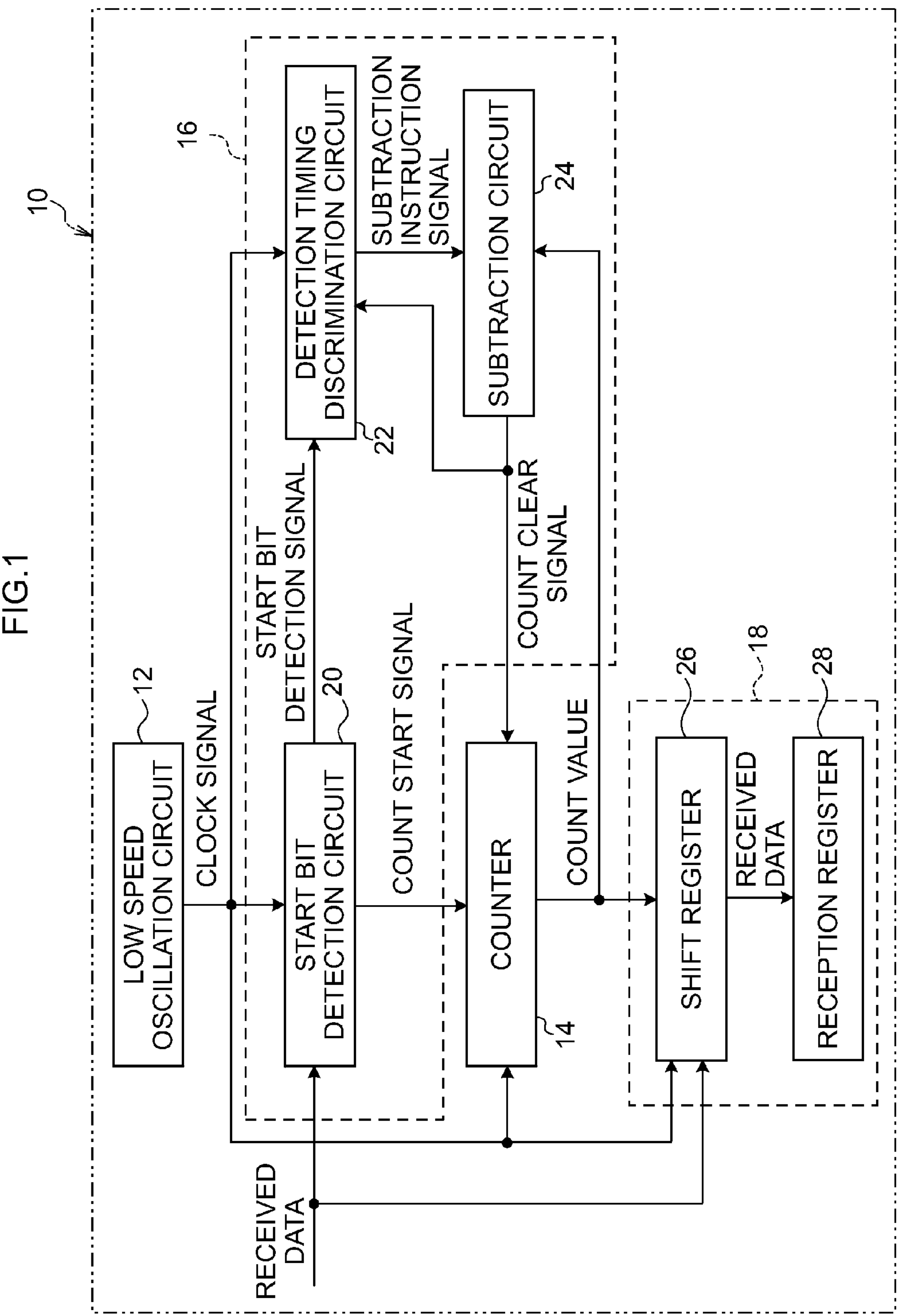
FIG. 1 is a block diagram illustrating a configuration of a start-stop synchronous type serial data acquisition device according to an exemplary embodiment.

As illustrated in FIG. 1 as an example, a start-stop synchronous type serial data acquisition device 10 is a start-stop synchronous type device that acquires serial data per frame, and includes a low speed oscillation circuit 12, a counter 14, a changing section 16, and a received data acquisition section 18. Note that serial data per frame indicates data that includes, for example, M-bits of start bits, N-bits (N≥M) of data bits, M-bits of parity bits, and M-bits of stop bits.

The low speed oscillation circuit 12 generates and outputs a clock signal of 38.4 kHz as a clock signal that defines an acquisition timing of the serial data.

The counter 14 is connected to the low speed oscillation circuit 12, and counts the number of cycles of the clock signal that is input from the low speed oscillation circuit 12. In the present exemplary embodiment, the count value is increased by 1 per cycle, and is counted up from 0 up to 2 or 3 by the counter 14.

The changing section 16 changes a maximum value of the count value (hereinafter, maximum count value) that corresponds to the start bit counted by the counter 14, according to a transition of the clock signal at a timing at which the start bit is input. Note that the transition of the clock signal is a rise or a fall of the clock signal. In the present exemplary embodiment, 2 or 3 are selectively applied as the maximum count value according to the transition of the clock signal at the timing at which the start bit is input.

The changing section 16 includes a start bit detection circuit 20, a detection timing discrimination circuit 22, and a subtraction circuit 24. The start bit detection circuit 20 and the detection timing discrimination circuit 22 are connected to the low speed oscillation circuit 12, and are input with the clock signal.

The received data is input to the start bit detection circuit 20. Here, the received data is a serial data input to, for example, an input port (not illustrated in the drawings) of the start-stop synchronous type serial data acquisition device 10. The start bit detection circuit 20, which is connected to the low speed oscillation circuit 12, detects the start bit at the first input edge among the rising edges or the falling edges of the clock signal, when the start bit is input. The start bit detection circuit 20, which is connected to the detection timing discrimination circuit 22, outputs a start bit detection signal indicating that a start bit has been detected to the detection timing discrimination circuit 22 when a start bit is detected.

The start bit detection circuit 20, which is connected to the counter 14, outputs a count start signal instructing the start of counting to the counter 14 when the start bit is detected at the rising edge. The counter 14 starts the count from 0 when a count start signal is input.

In the present exemplary embodiment, the rise of the clock signal is an example of a first transition, and the fall of the clock signal is an example of a second transition.

The detection timing discrimination circuit 22 discriminates whether or not the start bit was first detected at the falling edge of the clock signal. The detection timing discrimination circuit 22 is connected to the counter 14 and the subtraction circuit 24, and outputs a subtraction instruction signal to the subtraction circuit 24 when it is determined that the start bit was first detected at the falling edge. The subtraction instruction signal is a signal that instructs to subtract 1 from the maximum count value.

The subtraction circuit 24 is connected to the counter 14, and is input with the count value. The subtraction circuit 24 outputs, to the counter 14 and the detection timing discrimination circuit 22, a count clear signal that instructs to clear the count value of the counter 14 (to return the count value to 0) based on the input subtraction instruction signal and the count value. The counter 14 clears the count value when the count clear signal is input. Further, the detection timing discrimination circuit 22 clears the subtraction instruction signal when the count clear signal is input. Note that, in a state in which the subtraction instruction signal has been input to the subtraction circuit 24, and when a count value (for example, 2), which is subtracted by 1 from the maximum count value (for example, 3), is input to the subtraction circuit 24, the count clear signal is output from the subtraction circuit 24. Further, after the subtraction instruction signal has been cleared, the count clear signal is then output by the subtraction circuit 24 each time the maximum count value (for example, 3) is input from the counter 14 to the subtraction circuit 24.

The received data acquisition section 18 includes a shift register 26 and a reception register 28. The shift register 26 is connected to the low speed oscillation circuit 12, the counter 14, and the reception register 28, and acquires the received data when 3, which is the maximum count value, is input. The shift register 26 outputs the acquired received data to the reception register 28 according to the clock signal. The reception register 28 holds the received data input from the shift register 26.

Figure 2:
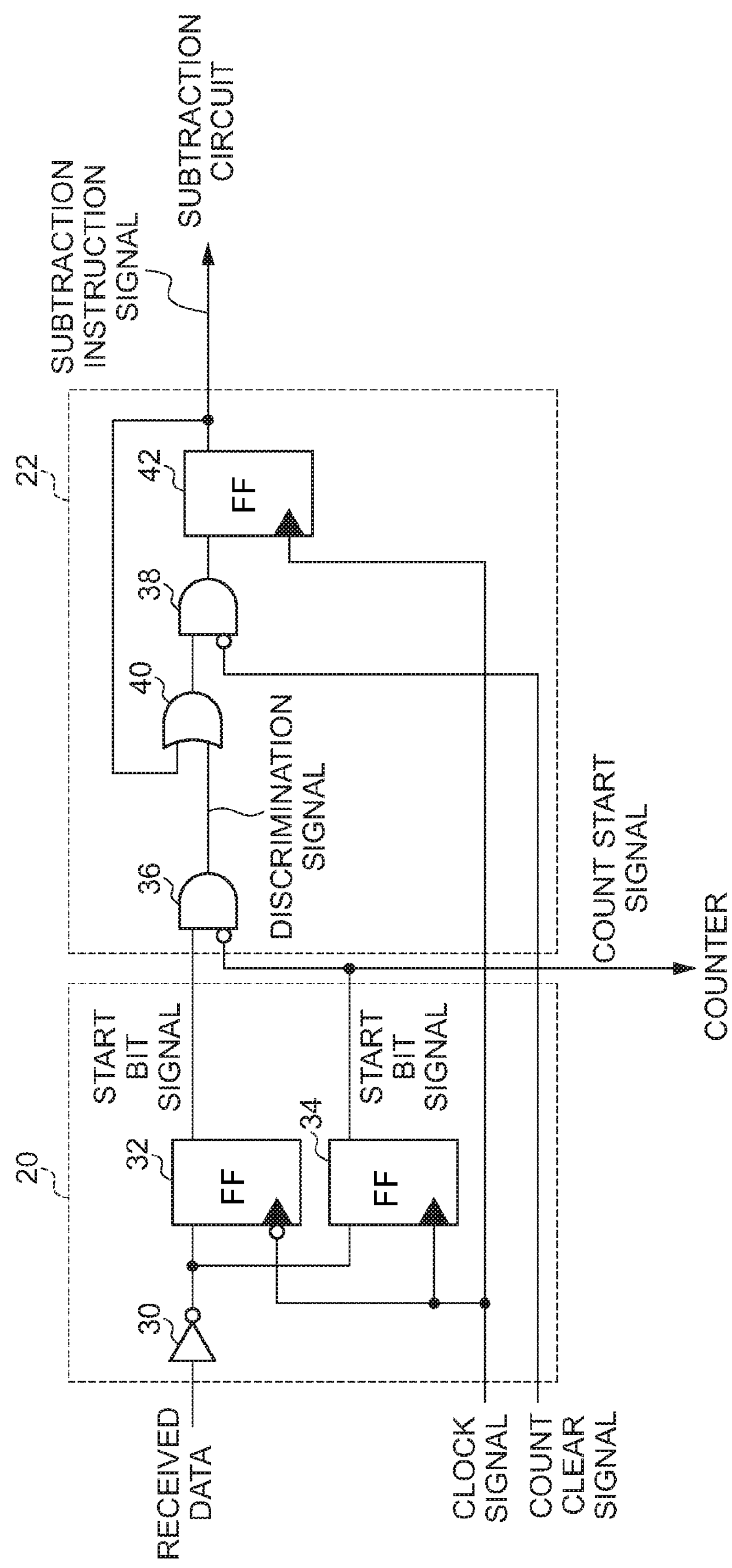
FIG. 2 is a circuit diagram illustrating configurations of a start bit detection circuit and a detection timing discrimination circuit included in a start-stop synchronous type serial data acquisition device according to an exemplary embodiment.

As illustrated in FIG. 2 as an example, the start bit detection circuit 20 includes an inverter 30, a first flip-flop 32, and a second flip-flop 34. The detection timing discrimination circuit 22 includes a first AND circuit 36, a second AND circuit 38, an OR circuit 40, and a third flip-flop 42. Note that the first flip-flop 32, the second flip-flop 34, and the third flip-flop 42 are D-type flip-flops.

The received data is input to the inverter 30. The inverter 30 inverts the input received data and outputs the inverted received data.

The output terminal of the inverter 30 is connected to one input terminal of the first flip-flop 32. The inverter 30 inputs the inverted received data to the first flip-flop 32. An inverted clock signal is input to the other input terminal of the first flip-flop 32. One input terminal of the first AND circuit 36 is connected to the output terminal of the first flip-flop 32. The first flip-flop 32 detects the start bit of the received data at the falling edge of the clock signal, and outputs the start bit signal to the one input terminal of the first AND circuit 36.

The output terminal of the inverter 30 is connected to one input terminal of the second flip-flop 34. The inverter 30 inputs the inverted received data to the second flip-flop 34. The clock signal is input to the other input terminal of the second flip-flop 34. The other input terminal of the first AND circuit 36 and the counter 14 are connected to the output terminal of the second flip-flop 34. The second flip-flop 34 detects the start bit of the received data at the rising edge of the clock signal, outputs the start bit signal to the other input terminal of the first AND circuit 36, and outputs the count start signal to the counter 14.

The start bit signal output from the first flip-flop 32 is input to the one input terminal of the first AND circuit 36.

The inverted start bit signal output from the second flip-flop 34 is input to the other input terminal of the first AND circuit 36. One input terminal of the OR circuit 40 is connected to the output terminal of the first AND circuit 36.

The first AND circuit 36 outputs a discrimination signal in a case in which the start bit was first detected at the falling edges of the clock signal. On the other hand, the first AND circuit 36 does not output the discrimination signal in a case in which the start bit was first detected at the rising edges of the clock signal. Here, a discrimination signal is a signal that indicates that a determination was made that the start bit was first detected at the falling edge of the clock signal.

One input terminal of the second AND circuit 38 is connected to the output terminal of the OR circuit 40. An inverted count clear signal is input to the other input terminal of the second AND circuit 38. One input terminal of the third flip-flop 42 is connected to the output terminal of the second AND circuit 38. The clock signal is input to the other input terminal of the third flip-flop 42. The other input terminal of the OR circuit 40 and the subtraction circuit 24 are connected to the output terminal of the third flip-flop 42.

The third flip-flop 42 outputs the subtraction instruction signal to the subtraction circuit 24 (see FIG. 1) in a case in which the discrimination signal is input to the first input terminal of the OR circuit 40, and clears the subtraction instruction signal in a case in which the inverted count clear signal is input to the second AND circuit 38.

Explanation next follows regarding operation of the start-stop synchronous type serial data acquisition device 10.

For ease of explanation, explanation follows regarding a case in which the start-stop synchronous type serial data acquisition device 10 acquires received data that is a single frame worth of serial data. Further, for ease of explanation, explanation follows regarding a case in which acquisition of received data is performed at the rising edges of the clock signal. Furthermore, explanation follows regarding a case in which the received data is received at 9600 bps. In such a case, the width of each bit becomes approximately 0.104 milliseconds (1 s/9600 b), and would correspond to 4 cycles at 38.4 kHz (0.26 milliseconds). Further, for ease of explanation, signal levels are denoted as H signals for high level signals, and L signals for low level signals, in the following explanation.

Figure 3:
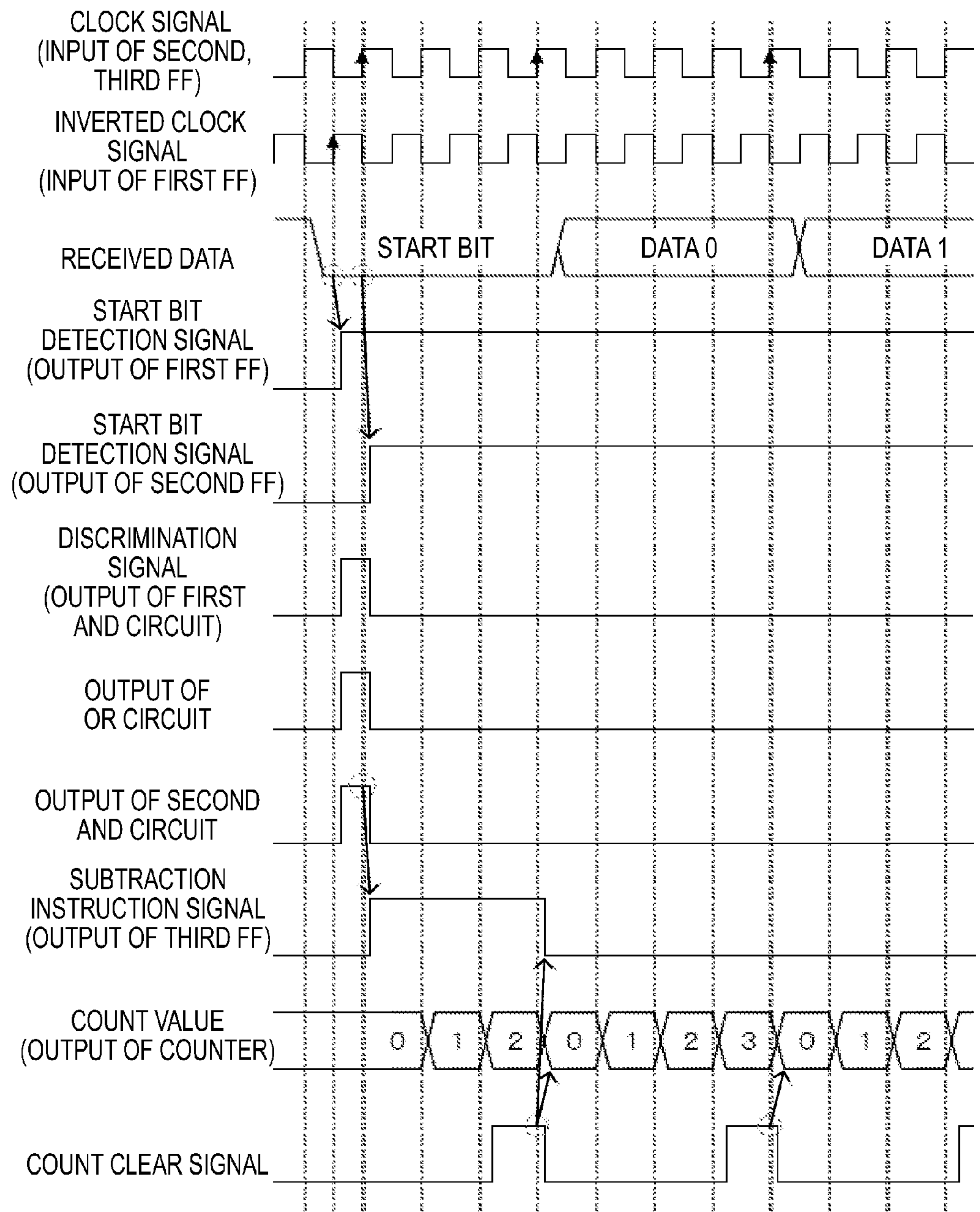
FIG. 3 is a timing chart illustrating an example of transition states in a case in which a start bit is detected at the falling edge of a clock signal before the rising edge of the clock signal, in a start-stop synchronous type serial data acquisition device according to an exemplary embodiment.

First, explanation follows regarding a case in which the start bit detection circuit 20 detects a start bit at the falling edge of the clock signal before the rising edge of the clock signal, with reference to FIG. 3.

As illustrated in FIG. 3 as an example, when the first flip-flop 32 detects the start bit included in the received data at the falling edge of the clock signal, the output of the first flip-flop 32 transitions from low level to high level, and the start bit detection signal that is an H signal is output by the first flip-flop 32.

When the start bit detection signal is input to the first AND circuit 36 from the first flip-flop 32 in a state in which the start bit detection signal has not been output by the second flip-flop 34, the first AND circuit 36 outputs the discrimination signal that is half a cycle of a H signal. The OR circuit 40 outputs half a cycle of an H signal when the discrimination signal is input to the OR circuit 40, and the second AND circuit 38 outputs half a cycle of an H signal when the H signal is input to the second AND circuit 38 from the OR circuit 40.

When the second flip-flop 34 detects a start bit at the rising edge of the clock signal, the output of the second flip-flop 34 transitions from low level to high level, and the second flip-flop 34 outputs the start bit detection signal that is an H signal.

The counter 14 starts the count from 0 when the start bit detection signal is input from the second flip-flop 34 to the counter 14 as a count start signal. 1 is added per cycle to the count value of the counter 14, and the added count value is output to the subtraction circuit 24 and the shift register 26.

The subtraction instruction signal that is 3 cycles of an H signal is output to the subtraction circuit 24 when an H signal is input to the third flip-flop 42 from the second AND circuit 38.

In a state in which the subtraction instruction signal has been input to the subtraction circuit 24, and when a count value of 2 is input to the subtraction circuit 24, the subtraction circuit 24 outputs the count clear signal, which is 1 cycle of an H signal, to the counter 14 and the second AND circuit 38. When the count clear signal is input from the subtraction circuit 24 to the counter 14, the count value of 2 is cleared and reset to a count value of 0. When the count clear signal is input to the second AND circuit 38 from the subtraction circuit 24, the output of the third flip-flop 42 transitions from high level to low level and the subtraction instruction signal is cleared. When the subtraction instruction signal is cleared, in the acquisition of data from then onwards (for example, when acquiring the data bits), the maximum count value returns from 2 to 3.

When the subtraction instruction signal is cleared, from then onwards, the counter 14 starts the count from 0 according to input of the clock signal, and the count value is output to the subtraction circuit 24 and the shift register 26. The shift register 26 acquires the received data when the count value of 3 (the maximum count value) is input to the shift register 26. The received data acquired by the shift register 26 is synchronized with the clock signal and is output to the reception register 28. The received data input to the reception register 28 from the shift register 26 is held by the reception register 28.

The subtraction circuit 24 outputs the count clear signal to the counter 14 when the count value of 3 is input to the subtraction circuit 24. When the count clear signal is input to the counter 14 from the subtraction circuit 24, the count value of 3 is cleared, and the count is restarted from 0.

Figure 4:
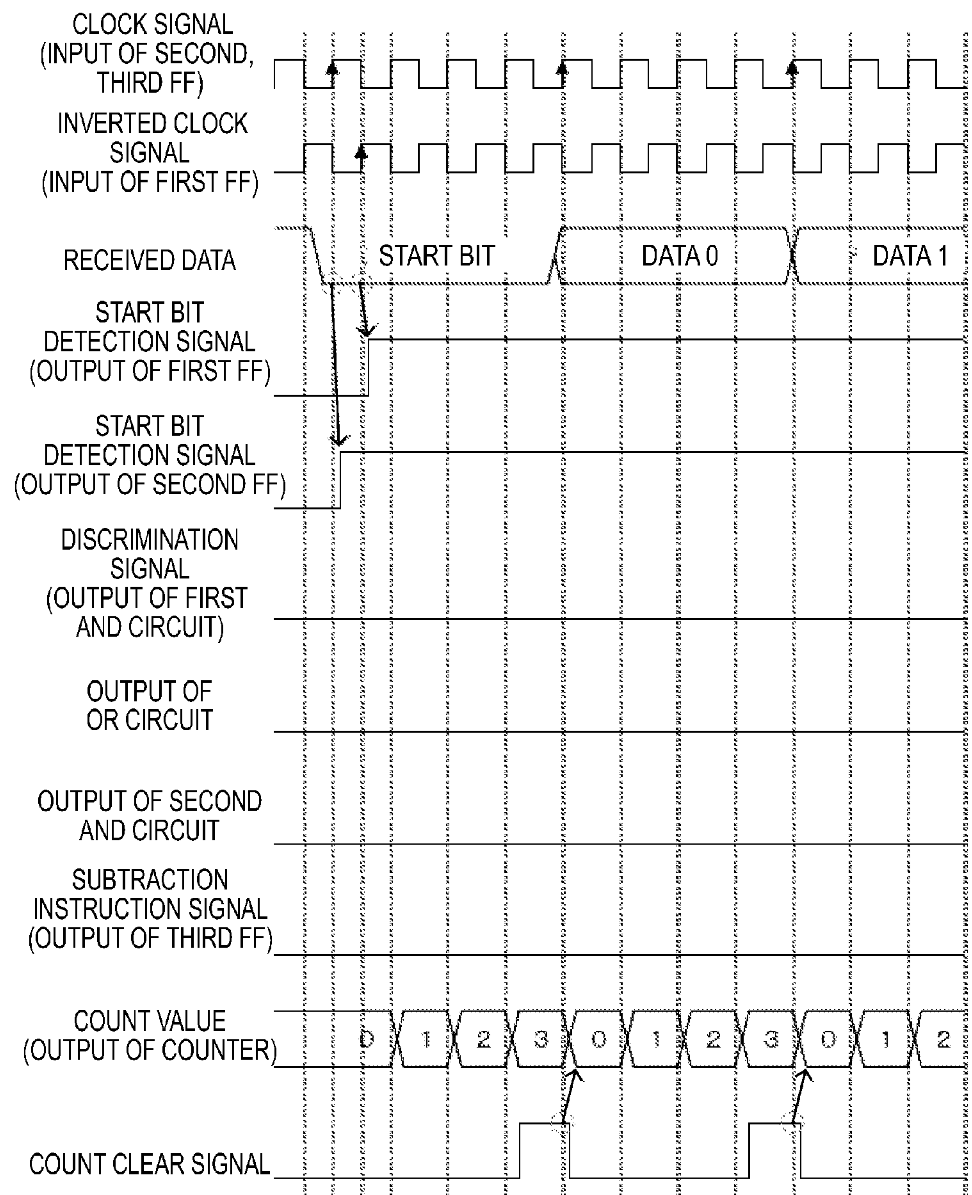
FIG. 4 is a timing chart illustrating an example of transition states in a case in which a start bit is detected at the rising edge of a clock signal before the falling edge of the clock signal, in a start-stop synchronous type serial data acquisition device according to an exemplary embodiment.

Explanation next follows regarding a case in which the start bit detection circuit 20 detects the start bit at the rising edge of the clock signal before the falling edge of the clock signal is input, with reference to FIG. 4.

As illustrated in FIG. 4 as an example, the second flip-flop 34 outputs the start bit signal when the second flip-flop 34 detects the start bit included in the input received data, at the rising edge of the clock signal.

The first flip-flop 32 outputs the start bit signal when half a cycle has passed from the detection of the start bit at the second flip-flop 34, and when the first flip-flop 32 has detected the start bit at the falling edge of the clock signal.

Accordingly, the first AND circuit 36 does not output the discrimination signal in a case in which the start bit has been detected at the rising edge of the clock signal before the falling edge of the clock signal is input. Therefore, the third flip-flop 42 does not output a subtraction instruction signal.

When the start bit detection signal is input to the counter 14 from the second flip-flop 34 as a count start signal, the counter 14 starts the count from 0. The count value of the counter 14 is output to the subtraction circuit 24 and the shift register 26.

In a state in which the subtraction instruction signal is not being input to the subtraction circuit 24, and when the count value of 3 (the maximum count value) is input to the subtraction circuit 24, the subtraction circuit 24 outputs the count clear signal to the counter 14. When the count clear signal is input to the counter 14 from the subtraction circuit 24, the count value of 3 is cleared, and the count value is reset to 0.

Thereafter, the counter 14 counts up the count value according to the input clock signal, and the count value is output to the subtraction circuit 24 and the shift register 26. When the count value of 3 (the maximum count value) is input to the shift register 26, the shift register 26 acquires the received data. The received data acquired by the shift register 26 is synchronized with the clock signal and is output to the reception register 28. The received data input to the reception register 28 from the shift register 26 is held by the reception register 28. When the count value of 3 is input to the subtraction circuit 24, the count clear signal is input to the counter 14 from the subtraction circuit 24, the count value of 3 is cleared, and the count value is reset to 0.

Figure 5:
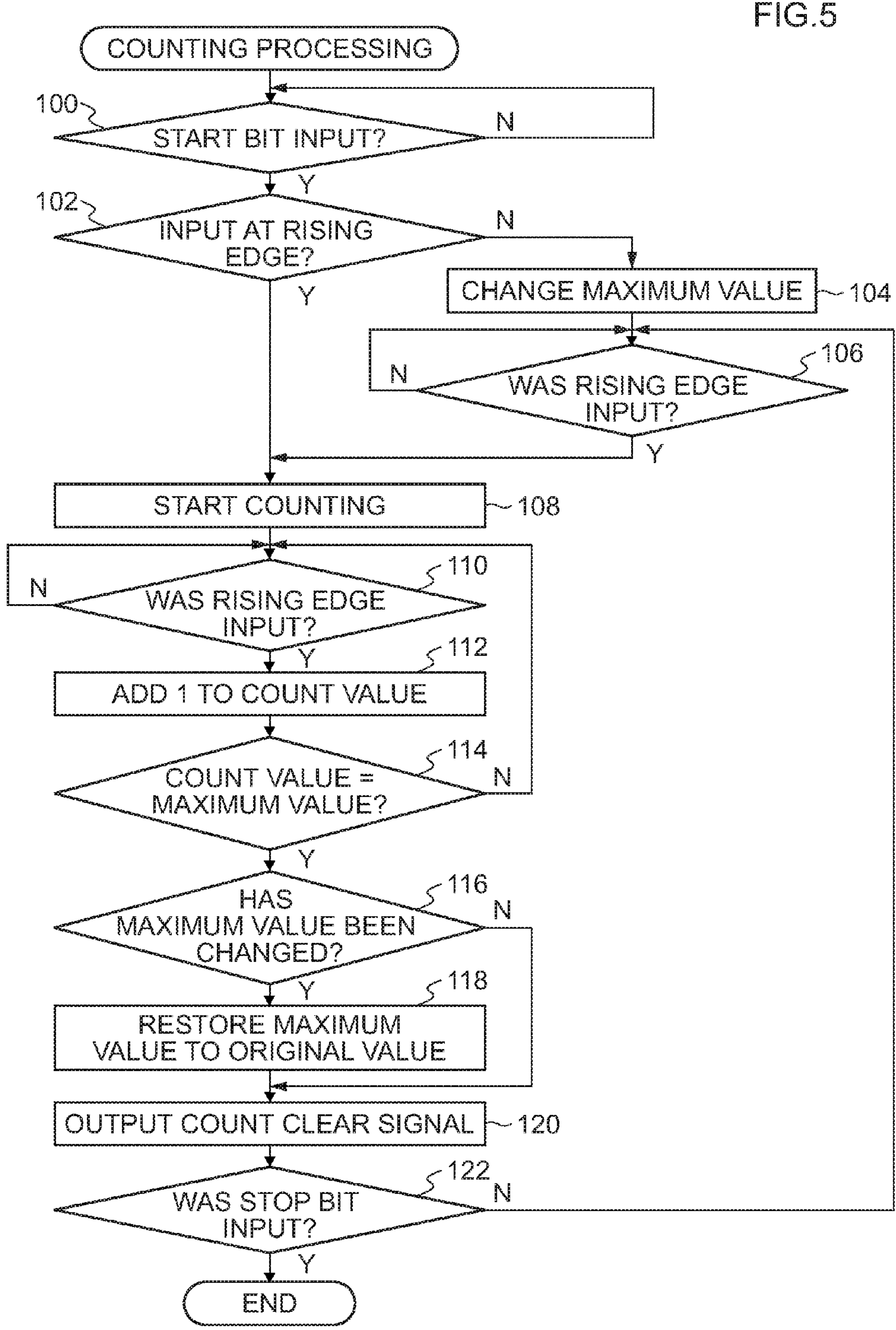
FIG. 5 is a flowchart illustrating a flow of count processing executed by a start-stop synchronous type serial data acquisition device according to an exemplary embodiment.

Explanation next follows regarding counting process executed by the start-stop synchronous type serial data acquisition device 10, with reference to FIG. 5.

In the counting processing illustrated in FIG. 5, firstly, at step 100, the changing section 16 determines whether or not the start bit has been input. In a case in which the start bit has not been input at step 100, negative determination is made, and the determination in step 100 is performed again. On the other hand, in a case in which the start bit has been input at step 100, affirmative determination is made, and process proceeds to step 102.

At step 102, the changing section 16 determines whether or not the start bit at step 100 was input at the rising edge of the clock signal. In a case in which the start bit at step 100 was input at the falling edge of the clock signal, negative determination is made at step 102 and process proceeds to step 104. On the other hand, in a case in which the start bit at step 100 has been input at the rising edge of the clock signal, affirmative determination is made at step 102, and process proceeds to step 108.

At step 104, the changing section 16 changes the maximum count value of the counter 14 from 3 to 2 by generating the subtraction instruction signal, and process proceeds to step 106.

At step 106, the changing section 16 determines whether or not the rising edge of the clock signal has been input. In a case in which the rising edge of the clock signal has not been input, negative determination is made at step 106, and the determination of step 106 is performed again. On the other hand, in a case in which the rising edge of the clock signal has been input, affirmative determination is made at step 106, and proceeds to step 108.

At step 108, the counter 14 starts the count from 0, and process proceeds to step 110.

At step 110, the counter 14 determines whether or not the rising edge of the clock signal has been input. In a case in which the rising edge of the clock signal has not been input, negative determination is made at step 110, and the determination of step 110 is performed again. On the other hand, in a case in which the rising edge of the clock signal has been input, affirmative determination is made at step 110, and process proceeds to step 112.

At step 112, the counter 14 adds 1 to the count value, and process proceeds to step 114.

At step 114, the changing section 16 determines whether or not the maximum count value of the counter 14 has been reached. In a case in which the maximum count value of the counter 14 has not been reached, negative determination is made at step 114, and process proceeds to step 110. On the other hand, in a case in which the maximum count value of the counter 14 has been reached, affirmative determination is made at step 114, and process proceeds to step 116.

At step 116, the changing section 16 determines whether or not the maximum count value of the counter 14 at the current time is the maximum count value that has been changed in the process of step 104 (=2). In a case in which the maximum count value of the counter 14 at the current time is the maximum count value that has been changed in step 104 (i.e., when the maximum count value=2), affirmative determination is made at step 116, and process proceeds to step 118. On the other hand, in a case in which the maximum count value of the counter 14 at the current time is not the maximum count value that has been changed in step 104 (i.e., when the maximum count value=3), negative determination is made, and process proceeds to step 120.

At step 118, the changing section 16 restores the maximum count value (=2) to the original value (=3) by clearing the subtraction instruction signal, and process proceeds to step 120.

At step 120, the changing section 16 outputs the count clear signal to the counter 14, and process proceeds to step 122. The count value is cleared in a case in which the count clear signal is input to the counter 14 by the process of step 120.

At step 122, the changing section 16 determines whether or not the stop bit has been input. In a case in which the stop bit has not been input, negative determination is made at step 122, and process proceeds to step 106. On the other hand, in a case in which the stop bit has been input, affirmative determination is made at step 122, and the current counting process ends.

As explained above, in the start-stop synchronous type serial data acquisition device 10, the changing section 16 changes the maximum count value that corresponds to the start bit, based on the transition of the clock signal at the timing at which the start bit included in the received data is input. Namely, in a case in which the transition of the clock signal when the start bit has been input is a rise, the maximum count value that corresponds to the start bit is set to 3. On the other hand, in a case in which the transition of the clock signal when the start bit has been input is a fall, the maximum count value that corresponds to the start bit is set to 2. Accordingly, delay in the detection of the start bit may be suppressed to half a cycle and the delay in the acquisition timing of the received data of one frame may be suppressed to half cycle.

In a case in which the number of cycles required for sampling one frame is from 44 cycles to 45 cycles, becomes $45/44*100=102.27$, and a delay of approximately 2.27% arises as the delay in the acquisition timing of the received data. Namely, delay that corresponds to 1 cycle may occur. Generally, in start-stop synchronous type serial communications, maximum tolerable delay per frame is approximately 3%. Accordingly, in a case in which a delay of approximately 2.27% arises, tolerable delay for a communication partner becomes 0.73% ($=3-2.27$).

In contrast, the start-stop synchronous type serial data acquisition device 10 of the present exemplary embodiment may suppress the delay in the acquisition timing of the received data to approximately 1.13%, which is a delay that corresponds to half a cycle. Accordingly, a rage of the tolerable delay for the communication partner may expand, compared to a case in which a delay that corresponds to 1 cycle arises.

Figure 8:
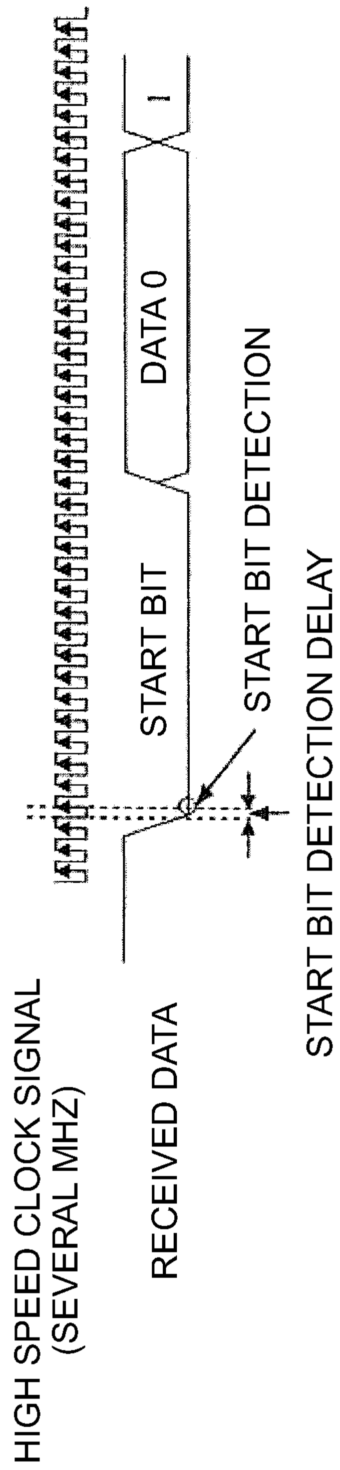
FIG. 8 is a timing chart illustrating an example of a relationship between a high speed clock signal and received data.
Figure 9:
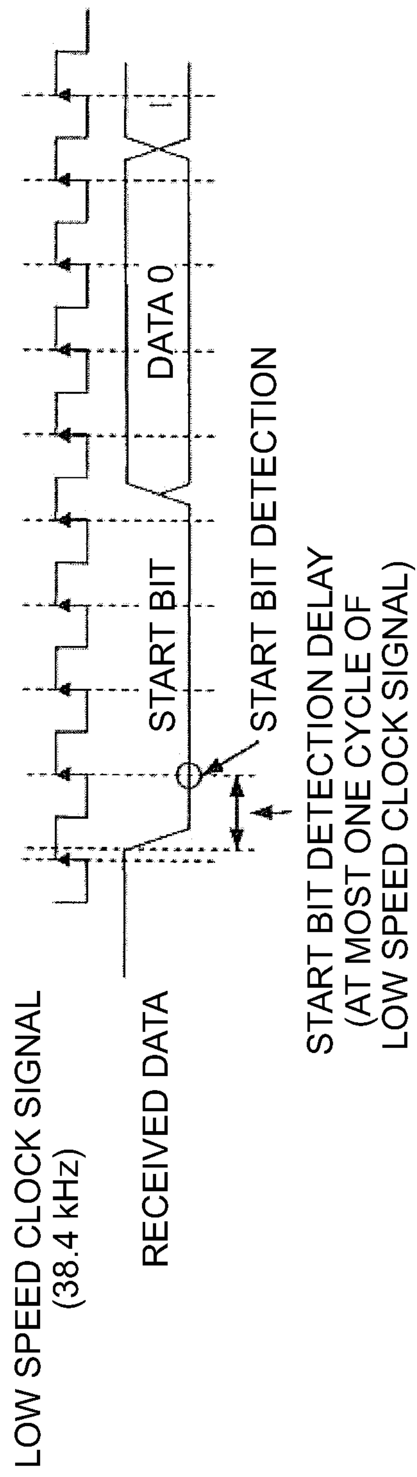
FIG. 9 is a timing chart illustrating an example of a relationship between a low speed clock signal and received data.

As illustrated in FIG. 8 as an example, in a conventional start-stop synchronous type serial communication, a sampling method using a high speed clock signal having an order of several MHz is commonly used in order to heighten the detection precision of the start bit, which is the leading data of the received data.

However, when a sample method that uses a high speed clock signal is employed, since the clock signal is generated with high frequency, current may be consumed wastefully.

In contrast, in the start-stop synchronous type serial data acquisition device 10 of the present exemplary embodiment, since there is no need to generate high frequency clock signal in order to suppress the delay in the acquisition timing of the received data, increases in current consumption may be suppressed, compared to a case that uses a high speed clock signal for sampling.

Further, according to the start-stop synchronous type serial data acquisition device 10 of the present exemplary embodiment, the maximum count value changes only in relation to the start bit included within 1 frame of the received data. Thus, in a case in which synchronizing design that uses RTL is employed, the start-stop synchronous type serial data acquisition device 10 of the present exemplary embodiment may reduce the difficulty of synchronizing design using RTL, compared to conventional technology that dynamically switches all operating clock signal edges based on which edge of the clock signal has sampled the received data.

Further, the start-stop synchronous type serial data acquisition device 10 of the present exemplary embodiment may suppress the increase in circuit scale, compared to conventional technology that selects the clock signal of an output stage, which is controlled by a circuit that operates at the rising edge of the clock signal and a circuit that operates at the falling edge of the clock signal.

Accordingly, the start-stop synchronous type serial data acquisition device 10 of the present exemplary embodiment may suppress the delay in acquisition timing of received data with a simple configuration.

Further, the start-stop synchronous type serial data acquisition device 10 of the present exemplary embodiment detects the start bit at the rising edge and the falling edge of the clock signal. Thus, in a case in which the start bit has been first detected at the rising edge of the clock signal, determination is made that the start bit has been detected within half cycle of the rising edge of the clock signal, and the maximum count value is not subtracted. On the other hand, in a case in which the start bit has been first detected at the falling edge of the clock signal, determination is made that the detection of the start bit has been delayed by half cycle or greater, and 1 is subtracted from the maximum count value. Namely, in a case in which the start bit has been first detected at the falling edge of the clock signal, the delay is suppressed to 0.5 cycle (=1−0.5) by subtracting 1 cycle from the start bit segment.

Accordingly, the start-stop synchronous type serial data acquisition device 10 of the present exemplary embodiment may obtain similar effects to a case in which a clock signal having twice the frequency is used when detecting only the start bit include within 1 frame of the received data.

Further, the start-stop synchronous type serial data acquisition device 10 of the present exemplary embodiment does not actually generate a clock signal having twice the frequency, and the start bit is detected at both the rising edge and falling edge of the clock signal. Thus, the start-stop synchronous type serial data acquisition device 10 of the present exemplary embodiment may suppress the delay in the acquisition timing of the received data with low current consumption, and may suppress increases in circuit scale, compared to a case in which a clock signal having twice the frequency is actually generated.

In the start-stop synchronous type serial data acquisition device 10 of the present exemplary embodiment, when 2, which is the maximum count value after subtraction, is counted by the counter 14, the count value of the counter 14 is reset, and the maximum count value is reset to 3, which is a value prior to subtraction. Accordingly, the start-stop synchronous type serial data acquisition device 10 of the present exemplary embodiment may enable data bits to be acquired by a configuration similar to in a case in which the maximum count value is not subtracted, even when the maximum count value is subtracted.

Further, in the start-stop synchronous type serial data acquisition device 10 of the present exemplary embodiment, the counter 14 counts at the rising edge of the clock signal. Accordingly, the start-stop synchronous type serial data acquisition device 10 of the present exemplary embodiment may adjust the timing at which the maximum count value is counted with the end of the start bit, even in a case in which the maximum count value has been changed.

Note that, in the above exemplary embodiment, an example in which the start-stop synchronous type serial data acquisition device 10 includes the changing section 16, has been described. However, there is no limitation thereto. For example, as illustrated in FIG. 6, technology of the present disclosure may be applied to a start-stop synchronous type serial data acquisition device 50.

Figure 6:
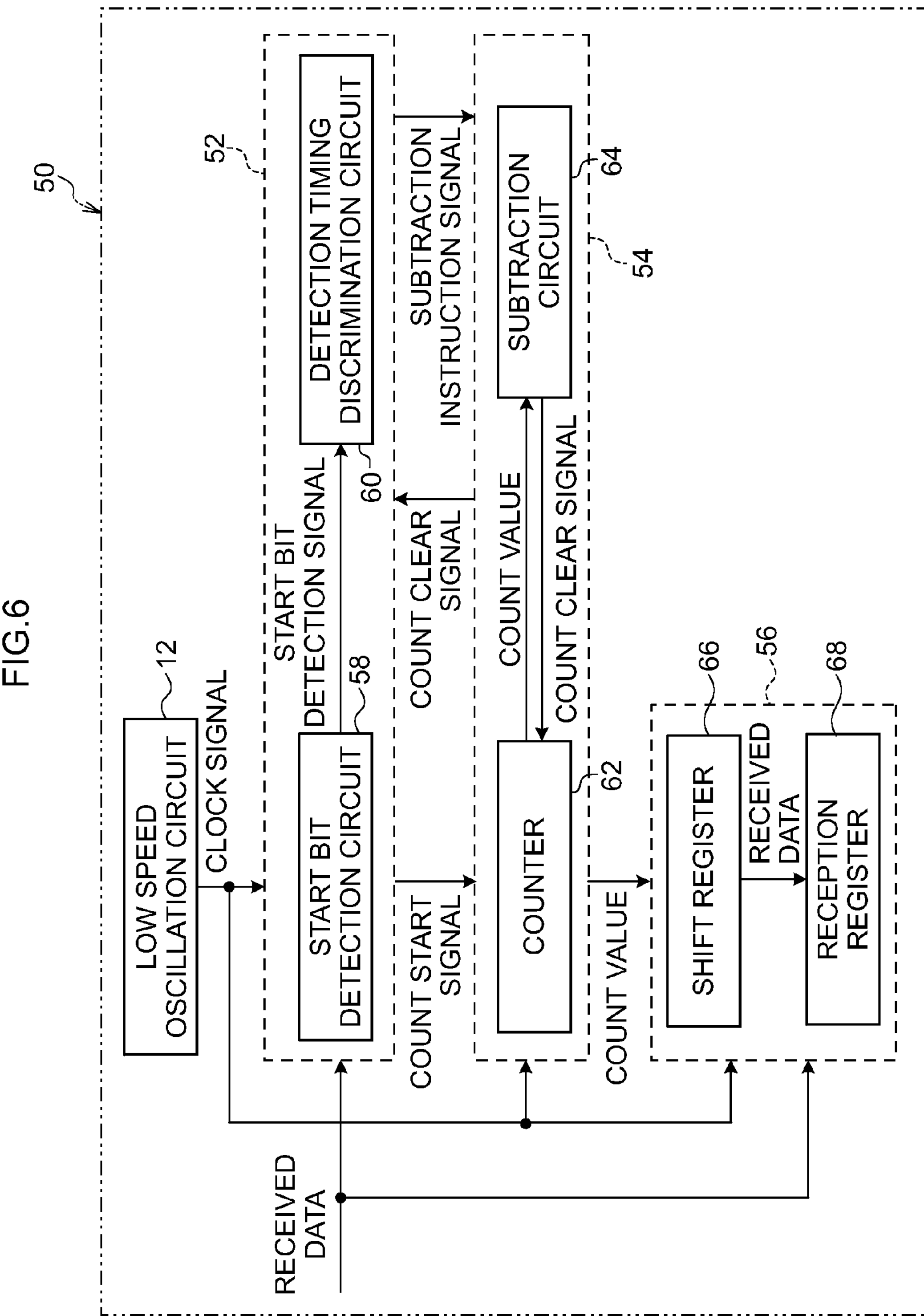
FIG. 6 is a block diagram illustrating a modified example of a start-stop synchronous type serial data acquisition device according to an exemplary embodiment.
Figure 7:
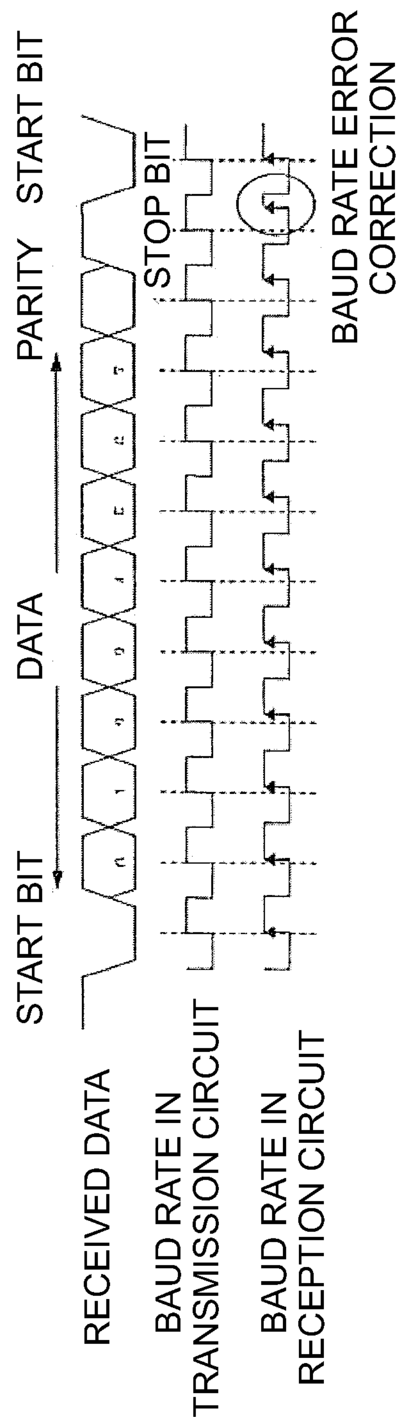
FIG. 7 is a timing chart illustrating examples transition states of received data, the baud rate in a reception circuit, and the baud rate in the reception circuit, in a case in which delay in the baud rate in the reception circuit is corrected when stop bit is detected.

Explanation follows regarding differences between the start-stop synchronous type serial data acquisition device 10 and the start-stop synchronous type serial data acquisition device 50, with reference to FIG. 6. The start-stop synchronous type serial data acquisition device 50 differs from the start-stop synchronous type serial data acquisition device 10 in that the start-stop synchronous type serial data acquisition device 50 includes a sampling section 52 instead of the changing section 16, includes a counting section 54, and includes a received data acquisition section 56 instead of the received data acquisition section 18.

The sampling section 52 includes a start bit detection circuit 58 and a detection timing discrimination circuit 60. The received data and the clock signal are input to the sampling section 52. The received data input to the sampling section 52, and the clock signal, are input to the start bit detection circuit 58. The start bit detection circuit 58 outputs a start bit detection signal to the detection timing discrimination circuit 60, and generates a count start signal. The detection timing discrimination circuit 60 generates a subtraction instruction signal. The sampling section 52 outputs the count start signal and the subtraction instruction signal to the counting section 54.

The counting section 54 includes a counter 62, which is a counting circuit that counts the number of cycles of the input clock signal, and a subtraction circuit 64. The counting section 54 outputs a count clear signal generated by the subtraction circuit 64 to the sampling section 52. The subtraction circuit 64 outputs the count clear signal to the counter 62. The counter 62 starts counting when the count start signal is input to the counting section 54. The counter 62 outputs the count value to the subtraction circuit 64. The counting section 54 outputs the count value of the counter 62 to the received data acquisition section 56.

The received data acquisition section 56 includes a shift register 66 and a reception register 68. The count value, the received data, and the clock signal are input to the received data acquisition section 56. When the count value 56 is input to the shift register 66 by the received data acquisition section, the shift register 66 acquires the received data, synchronizes the acquired received data with the clock signal, and outputs the acquired received data to the reception register 68. The reception register 68 holds the input received data.

In the above exemplary embodiments, a case in which the maximum count value is subtracted when the start bit is detected at the falling edge of the clock signal before the rising edge of the clock signal is input. However, the present disclosure is not limited thereto. For example, configuration may be made such that the maximum count value is subtracted when the start bit is detected at the rising edge of the clock signal before the falling edge of the clock signal is input. In such case, configuration may be made such that the maximum count value is not subtracted when the start bit is detected at the falling edge of the clock signal before the rising edge of the clock signal is input.

Further, in the above exemplary embodiment, a case in which the count value is reset for every 4 cycles has been described. However, the count value may be reset less often than every 4 cycles, or every 5 or more cycles.

Further, in the above exemplary embodiment, a case in which the counter 14 performs counting at the rising edges of the clock signal has been described, since acquisition of the serial data is assumed to be performed at the rising edge of the clock signal. However, the present disclosure is not limited thereto. Namely, when acquisition of the serial data is performed at the falling edge of the clock signal, configuration may be made such that the counter 14 performs counting at the falling edges of the clock signal.

Further, in the above exemplary embodiment, a case in which a low speed clock signal is used has been described. However, it goes without saying that technology of the present disclosure functions in a case in which a high speed clock signal is used.

All cited documents, patent applications and technical standards mentioned in the present specification are incorporated by reference in the present specification to the same extent as if the individual cited document, patent application, or technical standard was specifically and individually indicated to be incorporated by reference.

Other aspects of the present disclosure relating to the above exemplary embodiments include the following.

The other aspect of the present disclosure is a start-stop synchronous type serial data acquisition device, which is input with serial data including a start bit and a clock signal that defines an acquisition timing for the serial data, the start-stop synchronous type serial data acquisition device including: a counter that counts a number of cycles of the input clock signal; and a subtraction circuit that changes a maximum count value that is counted by the counter, the maximum count value corresponding to the start bit.

In the above aspect, the counter may include the subtraction circuit.

The above aspects may further include: a sampling section that detects the start bit at a first transition and at a second transition of the clock signal, and that outputs to the subtraction circuit a subtraction instruction signal that instructs subtraction from the maximum count value based on the transition of the clock signal when the start bit was detected, and the subtraction circuit may change the maximum count value by subtracting from the maximum count value in a case in which the subtraction instruction signal is input from the sampling section.

In the above aspects, the sampling section may output the subtraction signal in a case in which the start bit was first detected at the second transition, and may not output the subtraction instruction signal in a case in which the start bit was first detected at the first transition.

In the above aspects, the counting section may include a counting circuit that counts the number of cycles of the clock signal; the subtraction circuit may output a count clear signal to the counting circuit and the sampling section that instructs clearing of the count value; the counting circuit may clear the count value when the count clear signal has been input from the subtraction circuit; and the sampling section may clear the subtraction instruction signal when the count clear signal has been input from the subtraction circuit.

In the above aspects, the sampling section may include: a start bit detection circuit that detects the start bit at the first transition and at the second transition; and a detection timing discrimination circuit that discriminates whether the start bit was detected at the first transition or at the second transition, that outputs the subtraction instruction signal in a case in which the start bit was first detected at the second transition, and that does not output the subtraction instruction signal in a case in which the start bit was first detected at the first transition.

In the above aspects, the start bit detection circuit may output to the counting section a count start signal that instructs start of count of the number of cycles of the clock signal by the counting section in a case in which the start bit was first detected at the first transition; and the counting section may start the count when the count start signal is input.

In the above aspects, the subtraction instruction signal may be a signal that instructs to subtract 1 from the maximum count value.

What is claimed is:

1. A start-stop synchronous type serial data acquisition device for acquiring serial data in start-stop synchronous type serial communication, the start-stop synchronous type serial data acquisition device comprising:

a counter to which a clock signal that defines an acquisition timing of the serial data including a start bit is input, and that is configured to count a number of cycles of the clock signal;

a changing circuit that, according to a transition of the clock signal when the start bit has been input, is configured to change a maximum count value that is counted by the counter, the maximum count value corresponding to the start bit; and a received data acquisition circuit configured to acquire the serial data per frame, each frame including start bits, data bits and stop bits, wherein the received data acquisition circuit is configured to start to acquire the serial data in a case in which the maximum count value is provided from the counter.

2. The start-stop synchronous type serial data acquisition device of claim 1, wherein the changing circuit is configured to detect the start bit at a first transition and at a second transition of the clock signal, to not change the maximum count value in a case in which the start bit was first detected at the first transition, and to change the maximum count value by subtracting from the maximum count value in a case in which the start bit was first detected at the second transition.

3. The start-stop synchronous type serial data acquisition device of claim 2, wherein, in a case in which the maximum count value changed by the changing circuit has been counted by the counter, the counter is configured to be reset, and the maximum count value is returned to a value before the change of the maximum count value.

4. The start-stop synchronous type serial data acquisition device of claim 2, wherein the counter is configured to count the number of cycles of the clock signal based on the first transition.

5. A start-stop synchronous type serial data acquisition method for acquiring serial data in start-stop synchronous type serial communication, the start-stop synchronous type serial data acquisition method comprising:

counting a number of cycles of an input clock signal that defines an acquisition timing for the serial data including a start bit;

according to a transition of the clock signal when the start bit has been input, changing a maximum count value that corresponds to the start bit; and acquiring the serial data per frame, each frame including start bits, data bits and stop bits, and the acquisition of the serial data being started in a case in which the maximum count value is counted by said counting.

* * * * *